Sept. 29, 1970     H. SPODIG     3,531,746
MAGNETIC PLATE AT THE HOLDING SURFACE OF A PERMANENT MAGNET DEVICE
Filed Aug. 7, 1968
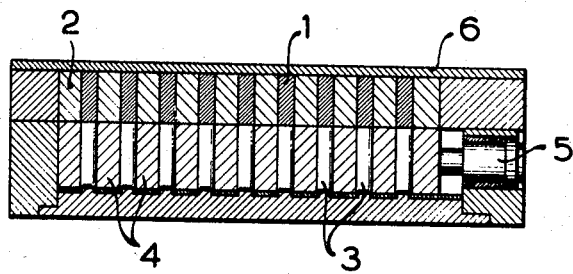
INVENTOR
HEINRICH SPODIG
By: Michael J. Striker
Attorney

United States Patent Office 3,531,746
Patented Sept. 29, 1970

3,531,746
MAGNETIC PLATE AT THE HOLDING SURFACE
OF A PERMANENT MAGNET DEVICE
Heinrich Spodig, 4711 Netteberge 84, Bork, Germany
Filed Aug. 7, 1968, Ser. No. 750,834
Claims priority, application Germany, Aug. 9, 1967,
1,627,263
Int. Cl. H01f 7/20
U.S. Cl. 335—286                                       3 Claims

ABSTRACT OF THE DISCLOSURE

Permanent magnet holding device comprising a permanent magnet system having pole pieces forming a holding plate, and a secondary plate formed of magnetic material disposed on said holding plate, the said secondary plate having an active cross-section and the said magnetic material having properties relative to the flux of said magnet system to provide for a magnetic stray flux from the plate over and above its magnetic saturation.

Cross references to related applications

Two related applications of the same inventor are filed concurrently herewith relating to "Permanent Magnet Device For Holding Or Conveying Purposes," SN 750,917 and "Endless Magnetic Conveyor," SN 750,918 respectively.

Background of the invention

The invention relates to a permanent magnet holding device which comprises a holding plate and a plurality of pole bars arranged in spaced relationship and separated by pieces of nonmagnetic material. The pole bars are actuated by a permanent magnet system which may be adapted to be switched on and off as desired. The holding plate in this kind of a device ordinarily forms an overall pole surface consisting of many individual magnetic circuits (north-south fields) with an inner magnetic flux as determined by the structure. The lines of force extend across an air gap into the applied work piece which is thus held in place. The holding power is therefore so much better as the penetration or traversal of the work piece by the lines of power is increased. Work pieces of a thicker dimension which possess a relatively large magnetic cross-section and overlap several or all of the north-south individual pole fields provide a better holding power because of the higher magnetic flux. This however implies on the other hand that work pieces of a small magnetic cross-section and with a surface smaller than the individual north-south pole fields will receive only an inadequate holding force.

Summary of the invention

The present invention has the object to avoid the shortcoming of conventional holding devices just described and to accomplish a better utilization of the magnetic flux. This is accomplished by a permanent magnet holding device comprising a permanent magnet system having pole pieces forming a holding plate, and a secondary plate formed of magnetic material disposed on said holding plate, the said secondary plate having a mass and volume and the said magnetic plate having properties relative to the flux of said magnet system to provide for a magnetic stray flux from the plate over and above its magnetic saturation.

The secondary plate used in this structure forms part of a partial magnetic short circuit. It thus constitutes a direct magnetic contact between the overall pole surface of the holding device and the work piece. The magnetic flux or stray field of the secondary plate is thus magnetically short circuited across the work piece, that is, it is included in the existing partial short circuit. Since in the magnetic short circuit the magnetic flux reaches an optimum magnitude, the best possible conditions are provided for a strong holding action. As a result, an improved yield of the input of magnetic energy and a better adaptation of this energy to the specific object of the device are accomplished.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

The single figure shows in a diagrammatic manner and in a longitudinal section a magnetic holding device of the invention.

Description of the preferred embodiments

With reference to the drawing, it will be noted that there is provided a multiplicity of pole bars 2 arranged side by side and spaced from each other by nonmagnetic parts 1. The pole bars 2 are provided with magnetic power from a permanent magnet system consisting of magnet 3 and pole pieces 4. The latter are connected in alternating manner with the magnets. The permanent magnet system may be actuated by means of a switch member 5 so that the magnetic flux to the holding plate may be shut off as desired. In accordance with the invention a secondary holding plate 6 is provided on top of the primary plate formed by the nonmagnetic members 1 and pole bars 2. The secondary plate completely covers the individual north-south pole fields and since it consists of magnetic material will result in a magnetic short circuit between the individual pole fields. The secondary plate 6 is dimensioned in a manner that it cannot absorb the entire magnetic flux and will therefore create a magnetic stray field or lines of force. A work piece placed on the secondary plate 6 enters into direct magnetic contact therewith. The magnetic stray field is thus included across the work piece in the existing partial magnetic short circuit.

Work piece and secondary plate 6 thus practically form one unitary magnetic body. This is of particular advantage wherever the work piece has a base surface smaller than the individual poles.

It will be understood that each of the elements described above, or two or more together, may also find a useful application in other types of constructions differing from the types described above.

While the invention has been illustrated and described as embodied in a permanent magnetic holding device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:
1. A permanent magnet chuck comprising a holding unit comprising a plurality of pole bars spcaed transversely from each other, a plurality of bars of nonmagnetic material sandwiched between said pole bars, said bars having upper faces located substantially in a plane, and permanent magnet means in contact with lower faces of said bars for producing in said pole bars a magnetic flux of predetermined magnitude; and a plate of magnetizable material contacting with a face thereof at least said upper faces of said pole bars, said plate having an active cross-section such that the magnetic flux of predetermined magnitude produced by said permanent magnet means is greater than necessary for magnetic saturation of said plate so that a magnetic stray flux will be produced over the other face of said plate, whereby magnetizable articles placed on said other face will be securely held by the magnetic force produced by said stray flux even if the size of said articles is smaller than the spacing between said pole bars.

2. A permanent magnet chuck as defined in claim 1, wherein said permanent magnet means comprises a plurality of permanent magnets spaced from each other in transverse direction and a plurality of pole pices sandwiched between said permanent magnets.

3. A permanent magnet chuck as defined in claim 1, and including means for changing the flow of magnet flux from said permanent magnet means to said pole bars.

References Cited

UNITED STATES PATENTS 2,795,740   6/1957   Bohli et al. _____ 335—295

FOREIGN PATENTS 428,287   5/1935   Great Britain.
939,584   10/1963   Great Britain.

GEORGE HARRIS, Primary Examiner

U.S. Cl. X.R.

335—295